United States Patent
Nakatsuchi et al.

(10) Patent No.: US 6,826,413 B1
(45) Date of Patent: Nov. 30, 2004

(54) PORTABLE TELEPHONE AND TERMINAL EQUIPMENT

(75) Inventors: Masaharu Nakatsuchi, Yokohama (JP); Masaaki Yamamoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 462 days.

(21) Appl. No.: 09/890,718

(22) PCT Filed: Dec. 7, 2000

(86) PCT No.: PCT/JP00/08651

§ 371 (c)(1),
(2), (4) Date: Aug. 3, 2001

(87) PCT Pub. No.: WO01/43403

PCT Pub. Date: Jun. 14, 2001

(30) Foreign Application Priority Data

Dec. 8, 1999 (JP) ............................................. 11-349460

(51) Int. Cl.[7] ................................................. H04Q 7/20
(52) U.S. Cl. .................................. 455/553.1; 554/556.2
(58) Field of Search ............................... 453/403, 412.1, 453/412.2, 414.1, 414.4, 550.1, 552.1, 556.1, 556.2, 557, 566, 553, 554

(56) References Cited

U.S. PATENT DOCUMENTS

| | | | |
|---|---|---|---|
| 4,185,282 A | 1/1980 | Pick | |
| 5,184,315 A | 2/1993 | Lapeyre | |
| 5,189,632 A | 2/1993 | Paajanen et al. | |
| 5,235,637 A | 8/1993 | Kraz et al. | |
| 5,361,083 A | 11/1994 | Pollack | |
| 5,379,338 A | 1/1995 | Umemoto et al. | |
| 5,500,643 A | 3/1996 | Grant | |
| 5,696,699 A | * 12/1997 | Nair ........................ | 455/422.1 |
| 5,930,719 A | * 7/1999 | Babitch et al. ............. | 455/462 |
| 5,946,376 A | * 8/1999 | Cistulli ..................... | 379/88.06 |
| 6,490,439 B1 | * 12/2002 | Croft et al. ................. | 455/90.1 |
| 6,633,314 B1 | * 10/2003 | Tuli ............................ | 345/744 |
| 2003/0162569 A1 | * 8/2003 | Arakawa et al. ............ | 455/566 |

FOREIGN PATENT DOCUMENTS

| | | |
|---|---|---|
| JP | S60-263992 | 12/1985 |
| JP | 09-116605 | 2/1997 |
| JP | H11-250009 | 9/1999 |

* cited by examiner

*Primary Examiner*—Congvan Tran
(74) *Attorney, Agent, or Firm*—Brinks Hofer Gilson & Lione (57) ABSTRACT

The portable telephone (and terminal equipment) according to the present invention comprises operating means 25 having a plurality of input modes and provided with at least one operating keys, for inputting data of a type in accordance with a current input mode by operation of the operating keys, a user interface process 23 for offering a user interface allowing input of data by the operating means 25, and input mode setup means 26 for switching the current input mode in the operating means 25 according to instructions of the user interface process 23. The above-mentioned user interface process 23 is generated by interpreting/executing means 22 by interpreting and executing HTML data received from receiving means 21. The type of data inputted by the operating means 25 can be switched in accordance with instructions of the user interface process 23.

54 Claims, 7 Drawing Sheets

PLEASE FILL IN THE NECESSARY INFORMATION

SEX  ○ MALE  ● FEMALE — RB

NAME ▭ — TIF1

POSTAL CODE ▭ - ▭ — TIF3
TIF2

ADDRESS ▭ — TIF4

SB — SEND   CANCEL — CB

| IDENTIFICATION INFORMATION | PROPERTY | INPUT DATA |
|---|---|---|
|  |  |  |
|  |  |  |
|  |  |  |
|  |  |  |

\<INPUT TYPE=text NAME=address INPUTMODE=KANA\>

FIG. 10 ex.) 12345 ex.) abcde

FIG. 11

MY NAME IS [　　].

# PORTABLE TELEPHONE AND TERMINAL EQUIPMENT

BACKGROUND OF THE INVENTION

1. Technical Field

The present invention relates to a portable telephone and terminal equipment in which various types of data can be inputted by switching between a plurality of input modes.

2. Background Art

Conventionally, mobile data communication systems capable of accessing computer networks such as the internet through mobile communication networks currently exist. As examples of this type of system, there are those which treat the portable telephone as a simple adapter, and use a notebook or laptop type computer as a data terminal equipment, or those which use the portable telephone itself as a data terminal equipment.

In systems treating portable telephones as simple adapters, the users must carry a data terminal equipment in addition to the portable telephone which reduces ease of portability, and requires work to physically connect the portable telephone and data terminal equipment, thus increasing the load on the user. In addition, improvements of peripheral technology enabled that portable telephones had features to be required as data terminal equipments. Due thereto, systems using the portable telephone itself as a data terminal equipment have been actively proposed and developed in recent years.

As an example of an actually existing service, there is a system wherein a browser, which is software for browsing data, is provided in the portable telephone, and internet WWW (World Wide Web) services are offered to users of portable telephones via the mobile communication network. In this system, when a portable telephone receives data (hereinafter referred to as HTML data) written in HTML (HyperText Markup Language) offered by a server on the internet, the HTML data is interpreted and executed at the portable telephone to generate a user interface (such as a graphical user interface) according to the HTML data, which is offered to the user of the portable telephone.

This being said, forms are widely used on the WWW as a method for servers to acquire input data from users over the internet. These forms are user interfaces which are provided by interpreting and executing HTML data. Each of forms usually has at least one text input fields for users to input text data. The data input procedures for such text input fields are usually as follows.

A user operates cursor moving means while referred to a form displayed on the display device to select a text input field in which to input data, then inputs data into the field. This procedure is repeated for the number of text input fields requiring data input, after which an instruction to transmit the inputted data is inputted. As a result, the data inputted into the form is sent to the server on the internet.

However, when inputting data into a text input field permitting the input of only a specific type of data, the user must operate data input means (such as a keyboard) for inputting the specific type of data. For example, if the selected text input field is a field for inputting a Japanese address, the data input means must be operated to enable input of kanji and kana characters, and if the field is for inputting one's age, it must be possible to input numerals.

In particular, in the case of Japanese, the characters displayed (inputted symbol code) will differ between hiragana and katakana even if the input procedure (key operating procedure) is exactly the same, so that the user must be able to designate which type of character to input. Additionally, when inputting Japanese, a method of using the Latin alphabet as phonetic symbols and converting the inputted letters into kana or kanji as required is widely employed. That is, when inputting Japanese, operations to select characters are necessary. This type of operation is also performed for inputting characters in languages other than Japanese (such as a portion of the languages other than Japanese utilized in various Asian countries). In contrast, with input systems that allow for the input of only numerals and alphabetic letters it is possible to eliminate the need for operations to select displayed characters. For example, an input system can be conceived wherein an input mode for inputting numerals, an input mode for inputting capital alphabet letters and an input mode for inputting lower case alphabet letters are provided and the input is performed after choosing one of these. However, in this case as well, an operation to switch input modes is required, just as for inputting Japanese addresses or inputting one's age. Of course, it is possible to reduce the number of the operations mentioned above as long as it is possible to use input means with enough operating keys such as a keyboard for inputting data into a computer, but providing such input means would require portability to be sacrificed.

The above operations require a lot of work of users, and in particular, they can be troublesome for users of portable telephones for which it is difficult to provide a sufficient number of operating keys for inputting various types of data and arrange the operating keys in such a way as to simplify data input. That is, in terminal equipments such as portable telephones, much troublesome work is required when trying to change the functions (resources) of a terminal equipment such as the input mode, thus for example requiring a lot of work of users when inputting data using forms.

SUMMARY OF THE INVENTION

One of the objects of the present invention is to offer a terminal equipment such as a portable telephone capable of reducing the work required of users when inputting data without complicating the operating system. Additionally, another object of the present invention is to offer a terminal equipment enabling users to readily make use of the resources in their own equipments.

In order to achieve the above-described purpose, the portable telephone or terminal equipment of the present invention comprises operating means having a plurality of input modes and provided with at least one operating keys, for inputting data of a type in accordance with a current input mode by operation of the operating keys; user interface providing means for providing a user interface allowing input of data by the operating means; and input mode setup means for setting up the current input mode in response to the user interface. According to this structure, the current input mode is set up according to the user interface, so that there is no need for the user to change the input mode manually.

Additionally, the user interface may be made into a visual user interface, or be such that the user interface has a plurality of input areas for inputting data, and each of the input areas has properties allowing input of specific types of data; comprising selecting means for selecting one input area from among the plurality of input areas; and the input mode setup means sets up, as the current input mode, an input mode in accordance with the property of the input area selected by the selecting means. In the former case, it becomes possible to use a large amount of existing content employing a visual user interface, and in the latter case, it is possible to achieve much more precise input mode switching.

Furthermore, in the latter case, by making the user interface a visual user interface and making the input area a region having spatial breadth, it is possible to use a large amount of existing content.

Furthermore, in each of the above structures, it is possible to have receiving means for receiving data from a mobile communication network (or communication network) side through a radio communication channel, with the user interface providing means providing a user interface allowing input of data by the operating means based on data received by the receiving means, or to have transmitting means for transmitting data inputted by operation of the operating means through a radio communication channel (or communication path) to a mobile communication network (or communication network) side. By employing such an arrangement, a flexible data communication system can be constructed.

Additionally, a terminal equipment according to another mode of the present invention comprises at least one resource; receiving means for receiving data for controlling the resource; and control means for controlling the resource based on data received by the receiving means.

Additionally, a terminal equipment according to yet another mode of the present invention comprises at least one resource; receiving means for receiving data; user interface providing means for providing a user interface based on data received by the receiving means; and control means for controlling the resource in accordance with the user interface.

Additionally, in the terminal equipments according to each of the modes described above, the resource may be a hardware resource, and the receiving means may receive the data through a communication terminal.

DESCRIPTION OF THE PREFERRED EMBODIMENT

Here below, preferred embodiments of the present invention shall be explained with reference to the drawings. The present invention is not restricted to these embodiments, and various modifications are possible within the scope of the technical concept thereof.

A: Mobile Data Communication System

A-1: Structure of Mobile Data Communication System

First, the overall structure of a mobile data communication system using a portable telephone according to the present invention shall be explained.

Figure 1:
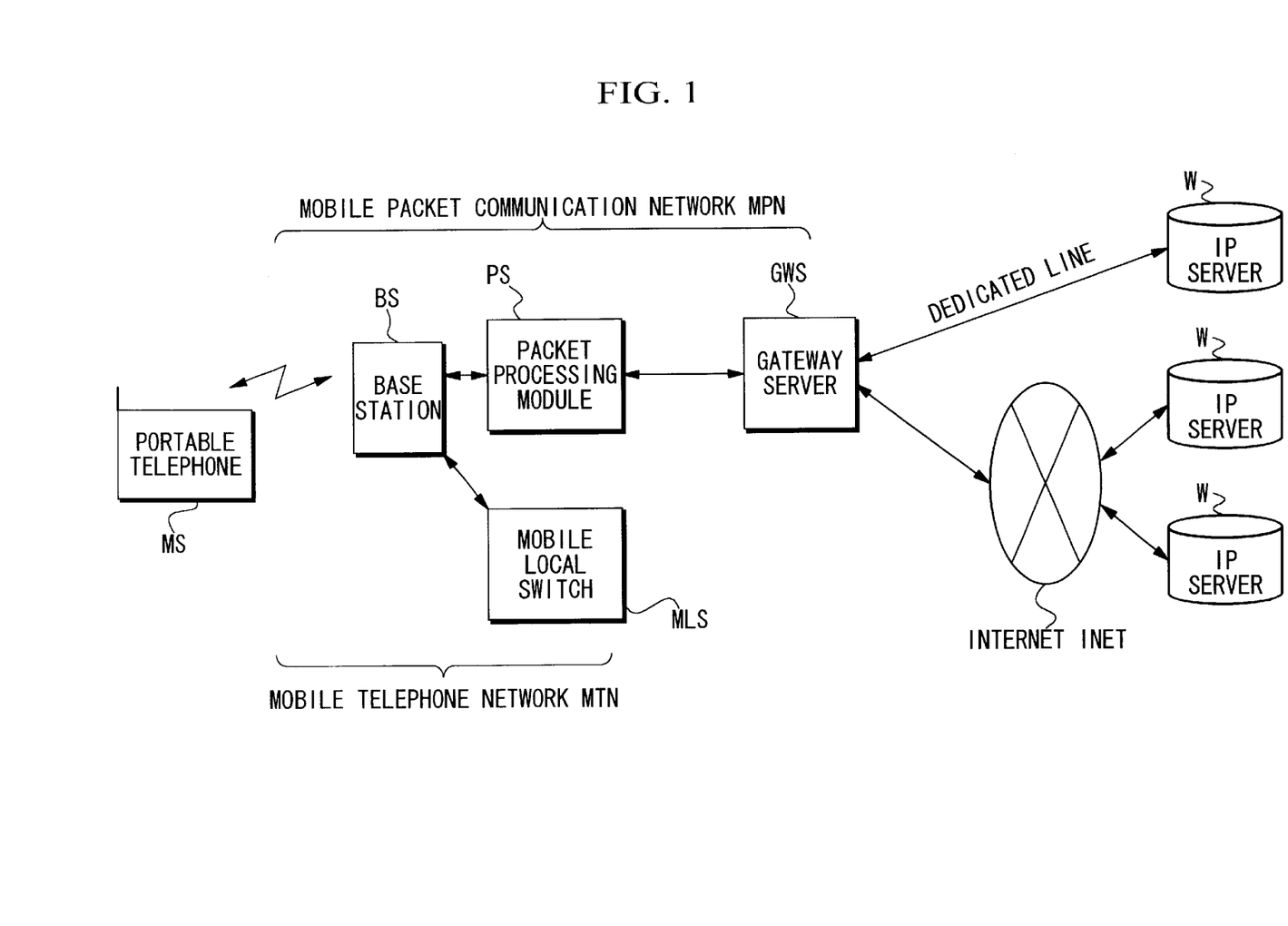
FIG. 1 is a block diagram showing the structure of a mobile communication system using a portable telephone MS according to an embodiment of the present invention.

FIG. 1 is a block diagram showing the structure of a mobile communication system using a portable telephone according to an embodiment of the present invention.

In the drawing, MS denotes a portable telephone which receives packet communication services from a mobile packet communication network MPN. This portable telephone MS is connected to the mobile packet communication network MPN and mobile telephone network MTN shown in this drawing. The mobile telephone network MTN is a network for offering general mobile telephone services, and the portable telephone MS is able to receive this telephone service. The structure of the portable telephone MS shall be described below. The mobile telephone network MTN comprises a base station BS to be described below and a mobile local switch MLS for providing call switching services.

The mobile packet communication network MPN comprises a base station BS, a packet processing module PS, a gateway server GWS and a communication path connecting these.

The base stations BS are provided at predetermined intervals formed by dividing the ground in a range of a radius of approximately 500 m, and each performs radio communications with portable telephones MS belonging to the radio zone created by each.

The packet processing module PS is a computer system provided at a packet subscriber exchange station which accommodates a plurality of base stations BS, for receiving packet switching requests from the portable telephones MS and relaying packet switching within the mobile packet communication network MPN.

The gateway server GWS is a computer system provided on a mobile packet gateway relay exchange station for interconnecting the mobile packet communication network MPN with other networks such as the internet INET, for converting between communication protocols that differ between networks. Here, the conversion of communication protocols specifically refers to conversion between the transmission protocol for the mobile packet communication network heeded by the mobile packet communication network MPN, and TCP/IP (Transmission Control Protocol/Internet Protocol) heeded by other networks such as the internet INET.

Additionally, the gateway server GWS, upon receiving a GET request in HTTP (HyperText Transfer Protocol) from the portable telephone MS, checks the URL (Uniform Resource Locator) contained in the GET request, and if it indicates a memory location inside the IP server W connected to the gateway server GWS through a dedicated line, the GET request is transferred to the IP server W and the reply is returned to the portable telephone MS. Additionally, when the URL in the GET request is a generally accessible URL on the internet INET, the GET request is transferred to the internet INET, and the reply sent from the internet INET in response to this GET request is returned to the portable telephone MS.

Furthermore, the gateway server GWS works in conjunction with the IP server W to control information distribution services such as the sending and receiving of electronic mail and various applications.

The IP server W is a server system operated by an IP (Information Provider), for sending out information to be provided to users to networks as HTML data. These IP servers W may be connected to the gateway server GWS through the internet INET or connected to the gateway sever GWS through dedicated lines. It is also possible to provide an IP server W inside a gateway server GWS.

A-2: Example of Operation of Mobile Data Communication System

Next, an example of operation of a mobile data communication system having the above-described structure shall be explained.

When a GET request is sent out from a portable telephone MS addressed to an IP server W connected to the internet INET, the gateway server GWS transfers this GET request to the IP server. The IP server W returns a response to the GET request through the gateway server GWS to the portable telephone MS. If the reply returned at this time is HTML data requesting input of user data (hereinafter referred to as form data), an input process for user data is performed at the portable telephone MS which received the reply and the inputted user data is sent all at once to the IP server W.

B: Structure of Portable Telephone MS

B-1: Hardware Structure of Portable Telephone MS

Figure 2:
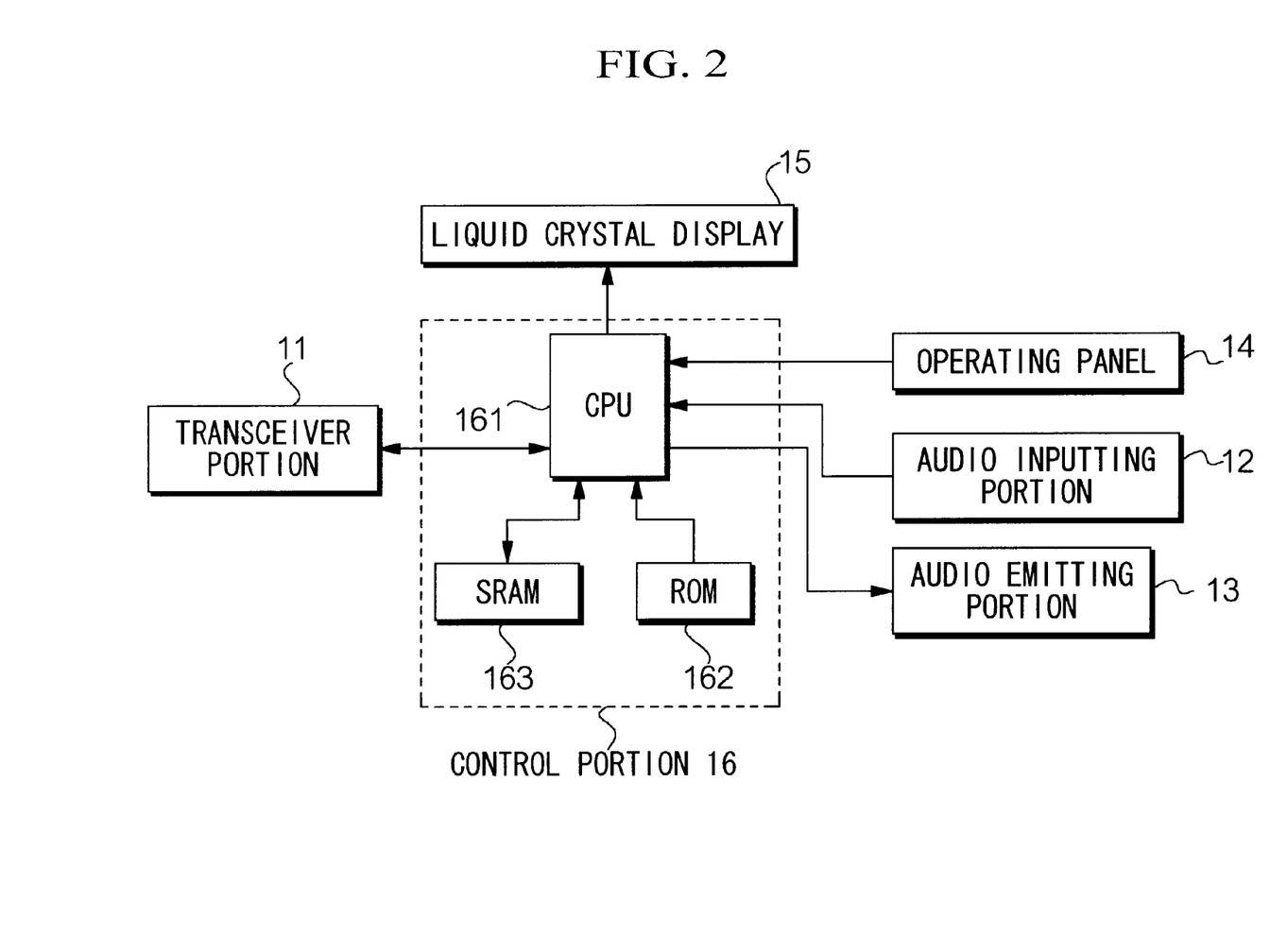
FIG. 2 is a block diagram showing the hardware structure of the same portable telephone MS.

FIG. 2 is a block diagram showing the hardware structure of the portable telephone MS, and as shown in the drawing, the portable telephone MS comprises internally a transceiver portion (such as an antenna, radio portion, transmitter and receiver) 11 for performing radio communications with the base station BS, an audio inputting portion (such as a mike) 12 for inputting sound, an audio emitting portion (such as a speaker) 13 for emitting sounds, an operating panel 14 provided with operating keys operated by a user, a liquid crystal display 15 having a liquid crystal panel or the like, and a control portion 16 for controlling these portions.

The above operating panel 14 is provided with a ten-key for inputting telephone numbers and various types of data, a power button for instructing whether to turn the power on or off, a communication mode switching button for switching between an voice calling mode for making telephone calls and a data transmission mode for performing data transmissions, and an input mode switching button for instructing the input mode to be switched.

Additionally, The control portion 16 contains a CPU (Central Processing Unit) 161 for performing various types of control, a ROM (Read Only Memory) 162 for storing various programs and specific URL's and an SRAM (Static Random Access Memory) 163 for storing telephone book data and the current input mode and the like, such that when the power button is depressed and a power supply which is not shown is turned on, the CPU 161 reads and executes a basic control program stored in the ROM 162 to control the ROM 162, SRAM 163, transceiver portion 11, audio inputting portion 12, audio emitting portion 13, operating panel 14 and liquid crystal display 15. Here, the SRAM 163 described above is merely one possible example, and the means for storing the current input mode can be another type of non-volatile memory such as an EEPROM.

As described above, the portable telephone MS comprises as communication modes a calling mode for making telephone calls and a data mode for performing data transmissions, and when the communication mode changes to the data mode, it reads out a program (so-called browser) for browsing document data stored in the ROM 162, and runs the browser, upon which a dialog screen (hereinafter referred to as the initial screen) based on HTML data is displayed on the liquid crystal display 15. The operating panel 14 and liquid crystal display 15 are shared by the calling mode an data mode.

B-2: Functional Structure of Portable Telephone MS

Next, the functions of the portable telephone MS shall be explained in connection with the characteristic portions of the present invention. The functions explained here are functions provided due to the CPU 161 running the browser in the data mode. As for other functions, a general portable telephone function is also provided, but since this is commonly known, the explanation shall be omitted.

Figure 3:
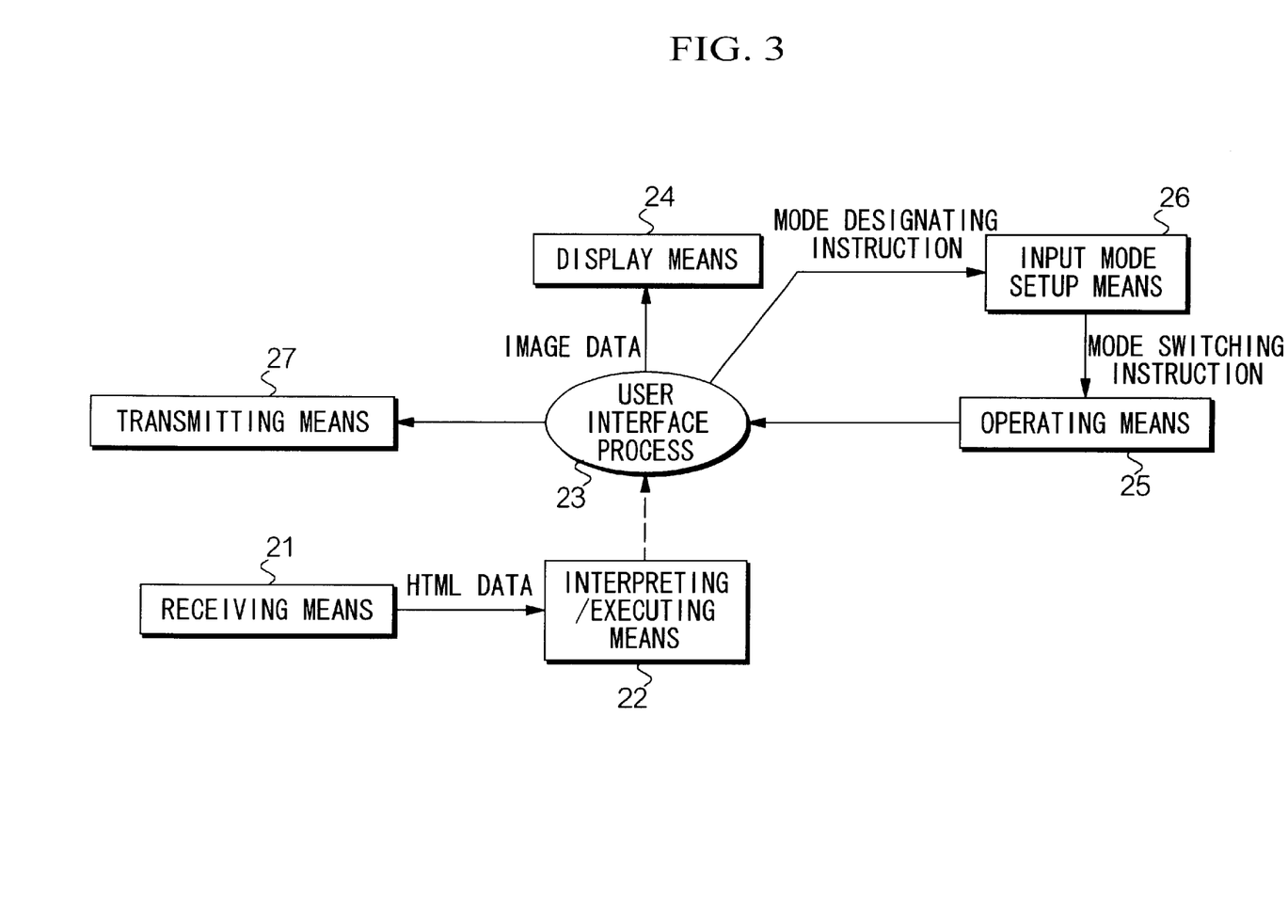
FIG. 3 is a block diagram for explaining the characteristic portions of the present invention in the functional structure of the same portable telephone MS.

FIG. 3 is a block diagram for explaining the functional structure of the portable telephone MS in connection with the characteristic portions of the present invention, wherein the functional elements offered by the CPU 161 running the browser in data mode are shown as blocks.

As shown in this drawing, the above-described functional elements include receiving means 21 for receiving HTML data from the mobile packet communication network MPN, interpreting/executing means 22 for interpreting HTML data received by the receiving means 21 and executing a procedure in accordance with the results of the interpretation, a user interface process 23 which is a process generated as a result of execution by the interpreting/executing means 22, display means 24 for displaying display data outputted from the user interface process 23, operating means 25 for changing the input mode according to mode switching instructions, input mode setting means 26 for outputting mode switching instructions in accordance with mode designation instructions form the user interface process 23 to the operating means 25, and transmitting means 27 for transmitting transmission data from the user interface process 23 to the mobile packet communication network MPN.

In the above-described functional elements, the receiving means 21 and transmitting means 27 are functions achieved by the transceiver portion 11 in FIG. 2, the display means 24 is a function achieved by the liquid crystal display 24, and the interpreting/executing means 22 is a function achieved by the CPU 161 running the browser. The interpreting/executing means 22 prepares an object table OT to be described in detail below, and also performs processes using this.

The user interface process 23 is a process generated by the CPU 161 running the browser in accordance with HTML data received by the transceiver portion 11, and its functions depending on contents in the HTML data. For example, when HTML data describing a form having a text input field is received by the transceiver portion 11, a page having a text input field and a cursor for inputting data are displayed on the display means 24, thus enabling data input to the text input field. Here, the types of data which are allowed to be inputted are types which are indicated in the HTML data as a property of the text input field.

The operating means 25 is a function that is achieved by the operating panel 14, the CPU 161 which has run the basic control program and the SRAM 163, comprising a process whereby the CPU 161 determines the input data based on the signals inputted by the operation of the ten-key on the operating panel 14 and the current input mode stored in a predetermined area of the SRAM 163, and a process whereby the CPU 161 changes the current input mode stored in the SRAM 163 to the next input mode upon depression of the input mode switching button in the operating panel 14. In the present embodiment, the input mode changes circularly, for example, from numerals to the alphabet to kana (kanji) to numerals, etc., each time the input mode switching button is depressed.

The input mode setting means 26 is a function performed by the CPU 161 running the browser and the SRAM 163, whereby the CPU 161 updates the current input mode stored in the predetermined area of the SRAM 163 so as to make the new input mode decided by the user interface process 23 (mode indicated by the mode designation instruction) the current input mode. The operating means 25 circularly updates the current input mode stored in the predetermined area of the SRAM 163 each time a mode switching instruction is received from the input mode setting means 26. For example, if the current input mode is the numeral input mode, and the new input mode decided by the user interface process 23 is the kana input mode, then a mode switching instruction is supplied from the input setting means 26 to the operating means 25 twice, thereby changing the current input mode to the kana input mode through the alphabet input mode.

C: Operations of Portable Telephone MS

Figure 4:
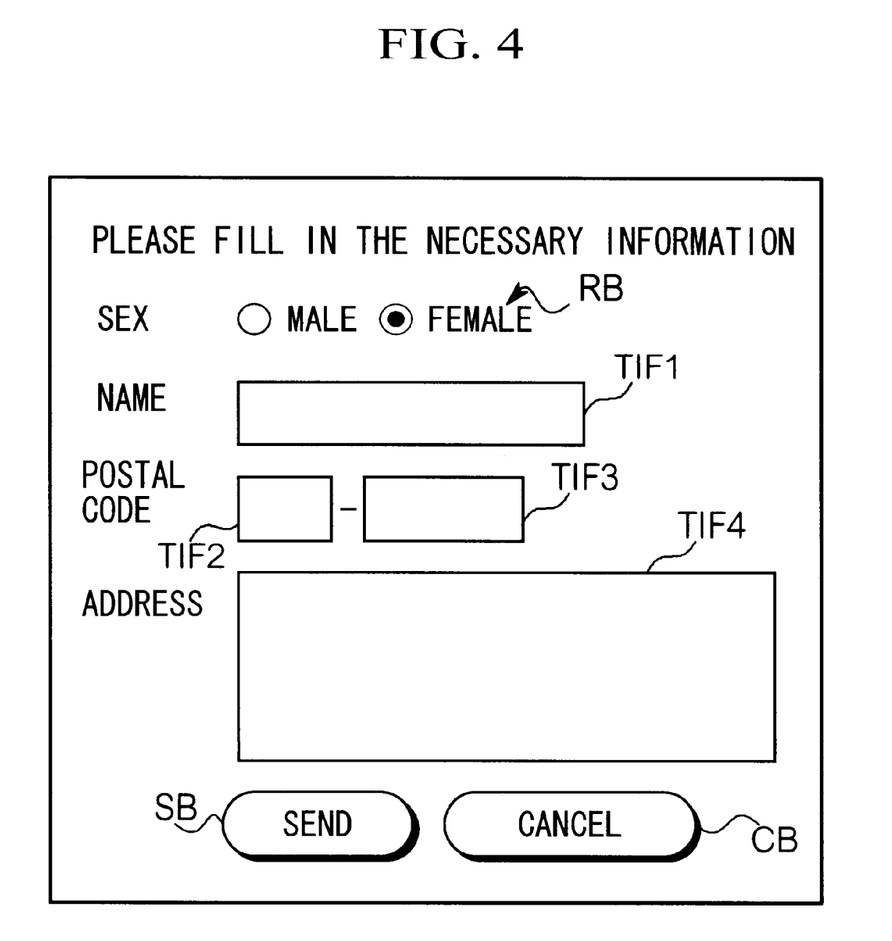
FIG. 4 is a diagram showing an example of a screen displayed by the same portable telephone MS.
Figure 5:
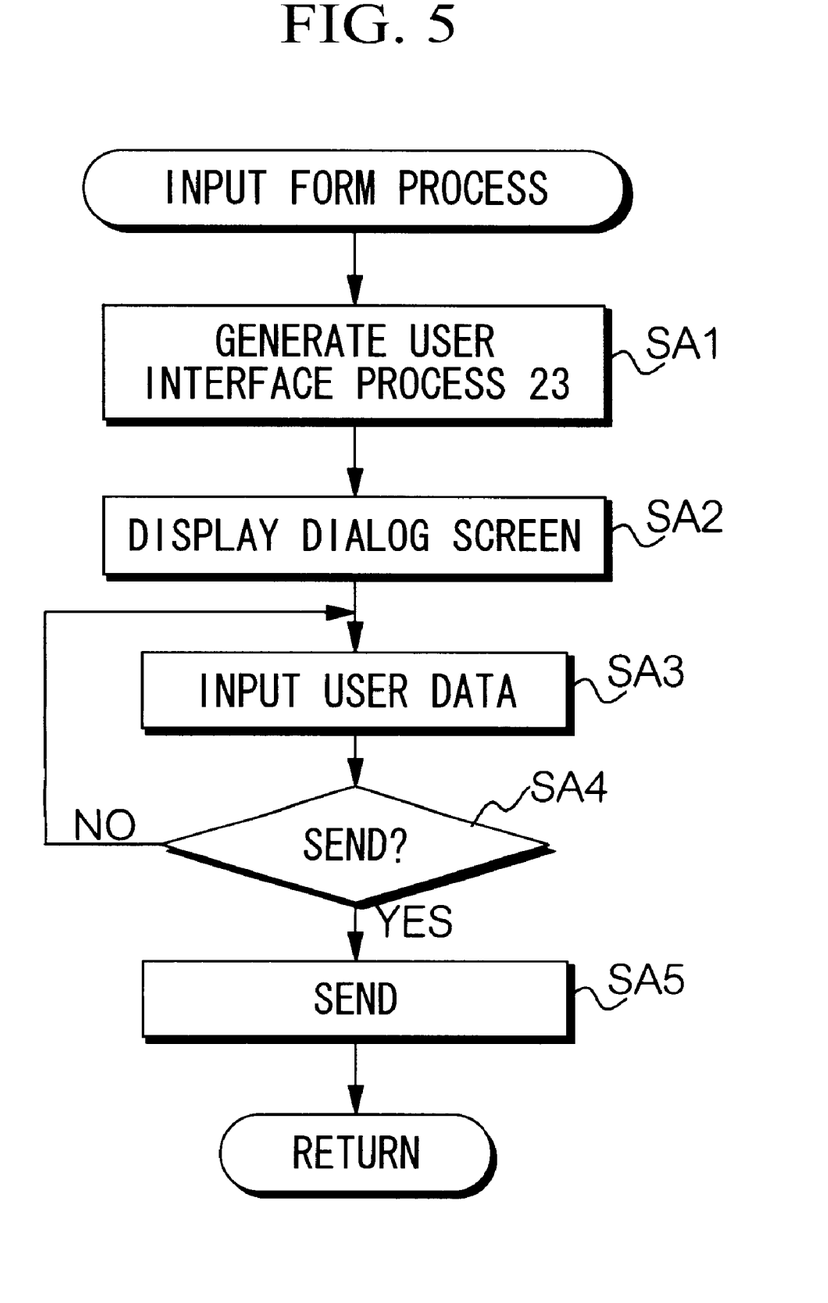
FIG. 5 is a flow chart indicating the flow of procedures at the same portable telephone MS from when form data are received until the content inputted by the user is sent.

Upon receiving form data providing a dialog screen such as is shown by example in FIG. 4, the portable telephone MS performs the process indicated in FIG. 5. In FIG. 4, RB denotes a radio button, wherein one of a plurality of buttons is selected by a user (the button corresponding to "female" in FIG. 4). TIF1–TIF4 respectively denote text input fields wherein, according to the user, the name is inputted in the text input field TIF1, the postal code is inputted in the text input fields TIF2 and TIF3, and the address is inputted in the text input field TIF4. SB denotes a send button, which when depressed by a user, sends the user data inputted in the form. CB denotes a cancel button, which when depressed by a user, initializes the form.

FIG. 5 is a flow chart showing the flow of procedures of the portable telephone MS from when the form data are received until the content inputted by the user is sent, the procedures indicated in this drawing being able to be achieved by the above-described means working in conjunction.

When the receiving means 21 receives the form data, the interpreting/executing means 22 interprets and executes the instructions making up the form data. As a result, the user interface process 23 is generated (step SA1). In the form data interpreting process, the interpreting/executing means 22 generates an object table OT (see FIG. 6) by forming correspondences between identification information for identifying all of the objects on the form and property information indicating the type (check boxes, buttons, text input fields, etc.) and properties (size, color, etc.) of the object. Here, the destination of the inputted data is also included in the properties of the send button on the form.

Figure 6:
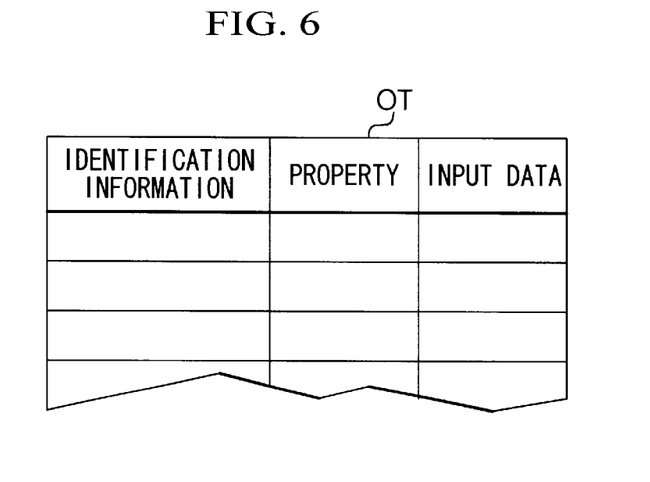
FIG. 6 is a diagram showing an example of the structure of an object table OT in the same portable telephone MS.

Furthermore, if a text input field to which an input mode designating tag is associated with the form exists during the process for generating the object table OT, the interpreting/executing means 22 stores in the object table OT the input mode designated by the input mode designating tag as a property of the text input field with which the tag has been associated.

Figure 7:
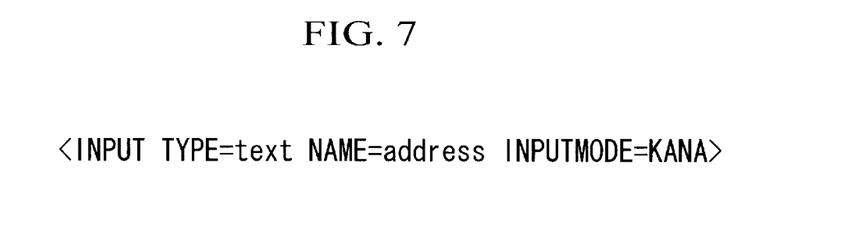
FIG. 7 is a diagram showing an example for the coding of input mode designating tags in the form data received by the same portable telephone MS.

An example of the writing of an input mode designating tag in the form data is shown in FIG. 7. The coding example shown in this drawing corresponds to the text input field TIF4 in FIG. 4. In this coding example, while the character string beginning with "input type" here is a generally used expression, the character string beginning with "inputmode" is a special expression for the present embodiment. Here, it is assumed that the input mode for the text input field TIF4 is kana (kanji) mode.

Figure 8:
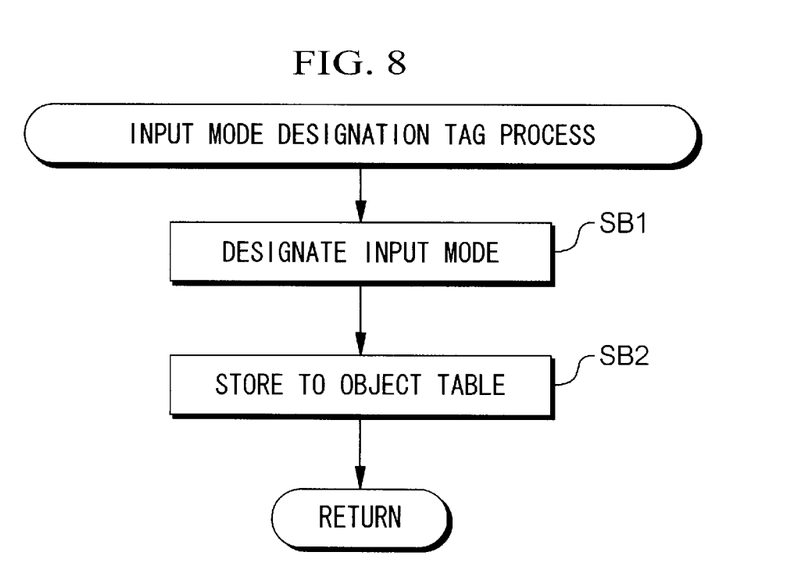
FIG. 8 is a flow chart showing the flow of procedures performed by the same portable telephone MS with respect to the input mode designating tags.

FIG. 8 is a flow chart showing the flow of procedures with respect to the input mode designation tags, and the interpreting/executing means 22 performs the procedure indicated in the flow chart each time it comes across a text input field with which an input mode designation tag is associated. As shown in this drawing, the interpreting/executing means 22 first specifies the input mode designated by the input mode designating tags (step SB1). Next, the interpreting/executing means 22 stores in the object table OT the input mode specified in step SB1 as a property of the text input field to which the tag is associated (step SB2).

Again with reference to FIG. 3, the user interface process 23 generated by the interpreting/executing means 22 has the display means 24 display a screen in accordance with the form data, i.e. a form (see FIG. 4) (step SA2). Subsequently, until an instruction to send data inputted to the form is inputted, a procedure for inputting data to the objects to which data input is allowed is performed by the operating means 25 and the input mode setting means 26 (step SA3).

The data input procedure differs according to the type and property of the object to which an input is made. If the object to which the input is made is a radio box or a list, the operation of the user will be completed simply by selecting a desired choice from among a plurality of choices. As a result, information indicating the selected choice is stored in the object table as input data for that object.

Figure 9:
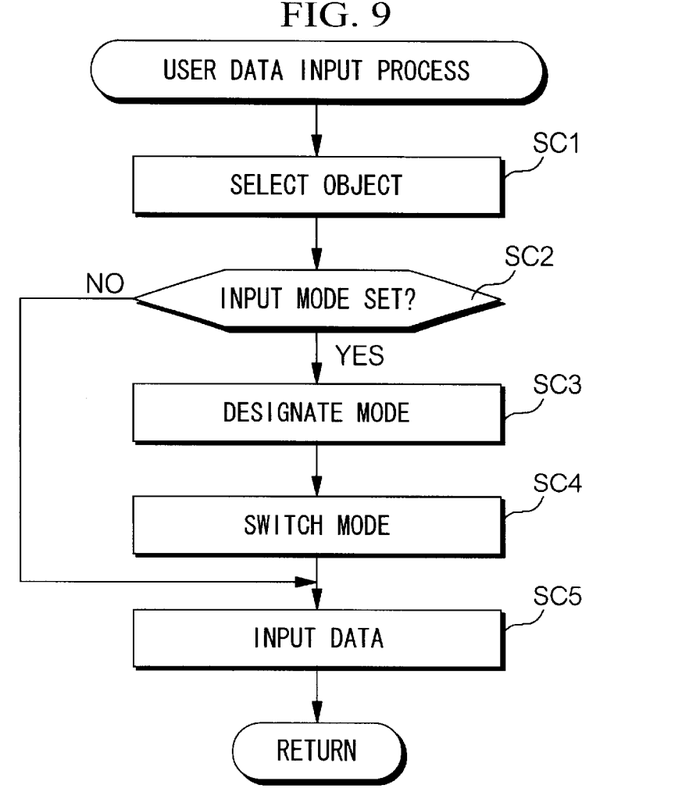
FIG. 9 is a flow chart showing the flow of procedures performed by the same portable telephone MS when an object to which data is to be inputted is a text input field.

If the object in which the input is made is a text input field, as shown in FIG. 9, the user first selects the object (step SC1). Consequently, the user interface process 23 obtains identification information for the object to which an input is made. The user interface process 23, having acquired the identification information, refers to the object table OT, and upon finding that the object is a text input field, enables the input of data to the text input field. As a result, the display means 24, for example, blinks a cursor at the head of the text input field.

Furthermore, if an input mode is set as a property of the text input field (step SC2), the user interface process 23 supplies the input mode setting means 26 with a mode designation instruction for changing the text input mode to the set input mode (step SC3). The input mode setting means 26 which has received the mode designation instruction supplies the operating means 25 with a mode switching instruction for a number of times depending on the input mode changing order, the current input mode and the mode designation instruction. The operating means which has received the mode switching instruction switches the input mode each time the instruction is received. As a result, the input mode is finally changed to the mode designated by the mode designation instruction (step SC4). Then, the input of data is allowed (step SC5).

If an input mode is not set as a property of the text input field, the user interface process 23 (step SC2), the procedure advances to step SC5 while retaining the current input mode.

When the data is inputted to the text input field in this way and the send button in FIG. 4 is depressed, the determination in step SA4 of FIG. 5 results in a "YES", and a send procedure is performed (step SA5).

In the transmission procedure of step SA5, transmission data is generated from the identification information of the object to which the data has been inputted and the corresponding input data by means of the user interface process 23, and an instruction to send this data to the destination stored in correspondence to the send button is supplied to the transmitting means 27. The transmitting means 27, upon receiving this instruction, sends the data to the destination (IP server W).

D: Supplemental Description

Figure 10:
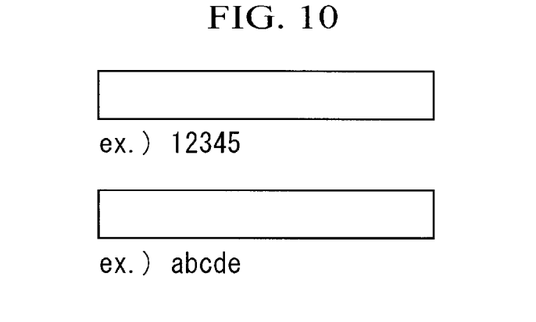
FIG. 10 is a diagram for explaining other examples of processes for switching input modes.
Figure 11:
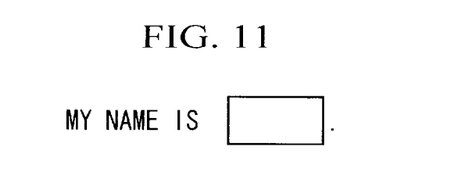
FIG. 11 is a diagram for explaining other examples of processes for switching input modes.

While the data input mode for the text input field was designated by using input mode designating tags in the above-described embodiment, there is no restriction to such an arrangement. For example, it is possible to include an input example for the text input field in the form data as shown in FIG. 10, and to designate the input mode of the text input field based on the type of character string contained in the input example, or to provide a text input field inside text as shown in FIG. 11, and to designate the input mode of the text input field based on the type of the preceding or subsequent string.

Additionally, while the string "inputmode" was given as an example of an indicator for switching input modes in the above-described embodiment, it is also possible to define and use other character strings as indicators.

Additionally, while an example wherein the input mode in the portable telephone MS is switched by means of the interpreting/executing means 22 preparing and using an object table OT was given in the above embodiment, this is only one possible example of installation in the portable telephone MS, and other configurations of the installation may be employed as well.

Additionally, in the above-described embodiment, an example of offering a user interface by means of images using HTML data was given, but it is also possible to have a character-based interface. Furthermore, it is possible to offer other user interfaces using data in formats other than the HTML format.

Additionally, numerals, the alphabet, and kana (kanji) were given as examples of input modes in the above-described embodiment, but the input mode to which the present invention is directed need not be restricted to these, and the present invention may just as well be applied to portable telephones supporting language systems different from Japanese (such as Chinese). Additionally, for example, if the portable telephone supports a plurality of languages such as in a Russian mode, a Mandarin mode, a Cantonese mode and the like, it is possible to apply the present invention with the respective language modes as input modes. Similarly, the present invention can be applied to portable telephones supporting input modes corresponding to a plurality of code systems.

Additionally, it is also possible to apply the present invention to portable telephones in which the user is capable of inputting images, audio and graphic characters, and to switch between input modes containing these. For example, it is possible to display a form in a portable telephone having a digital camera, such that when a field for inputting image data or a predetermined object on the form (such as the character string "take picture") is selected, the camera is automatically operated, and image data representing the taken image is inputted to the field. Of course, it is also possible to have an arrangement such that when a predetermined object (such as the character string "input audio") is selected, audio data inputted from the audio inputting portion is inputted to the field. In these embodiments, it is possible to enable a user to preset whether to automatically input image data or audio data in order to protect the privacy of the user.

Furthermore, the data capable of being inputted in each input mode does not have to be exclusively divided. For example, the present invention can be applied to portable telephones provided with input modes which are adapted to make it easier to input key words relating to finance or to input key words relating to shopping. In this case, it is possible to offer a service wherein the input mode of the portable telephone automatically changes to the input mode adapted for inputting key words relating to finance when a user operates the portable telephone displaying a menu offering various services to select a menu category relating to banking services.

Additionally, the user interface offered to the user need not be restricted to a visual user interface. For example, the user interface may be such as to select a menu category be following oral guidance.

Additionally, in the above-mentioned embodiment, an example of returning data inputted to the form to the source of the form data was given, but it can be sent to a server different from the source of the form. Additionally, an external device such as a computer may be connected to the portable telephone MS, and the input data can be sent to the external device without using the transmitting means 27 (i.e. without passing through the mobile communication network MPN). Furthermore, the destination of the input data may be inside the portable telephone MS. That is, the destination of the inputted data can be freely set within the range allowed by the processing system.

Additionally, in the above-described embodiment, an example wherein the form data are received through receiving means 21 (i.e. through the mobile communication network MPN) was given, but the form data can be pre-stored in the portable telephone MS, and received through a communication path (such as RS-232C) other than the mobile communication network MPN.

Furthermore, in the above-described embodiment, an example wherein the user inputted the user data after choosing an object in which to perform the input was given, but in the event that there is only one object into which to input on the form, it is possible to automatically select that object and to skip the user selection operation.

Additionally, it is possible to enable a data input mode to be set independent of the object. For example, if the HTML data contains information designating an input mode, it is possible to switch the input mode of all objects in a page that is expressed by HTML data in accordance with that information. That is, the input mode can be switched in units of HTML data (content).

Additionally, for example, an embodiment such that when a portable telephone having a plurality of standby screens accesses the homepage of a specific site, the standby screen of the portable telephone is automatically changed according to a standby screen change instruction written in the homepage. With this embodiment, by rewriting the content of the homepage of a specific site (change instruction), for example, every quarter, the standby screens of portable telephones accessing the site can be changed according to the season.

As is clear from the above, the object of switching in the present invention need not be restricted to the input mode. For example, in a portable telephone provided with a digital camera, image data representing a photographed image can be converted into image data of a size (and data size) designated by the form before inputting it into the field. The same also applies to audio, so that the sampling rate of audio data inputted from the audio inputting portion can be converted before being inputted to the field.

Furthermore, applied to portable telephones having a video playback mode, a music playback mode, a telephone-dedicated mode and the like, these modes can be made the object of switching. For example, it is possible to make it so that when a portable telephone accesses a site which distributes content, a screen for selecting the content to be distributed is displayed on the portable telephone, and when the desired content is selected by the operations of a user, the mode of the portable telephone automatically changes to a video playback mode, so that the settings of the liquid crystal display and the audio emitting portion are optimized for video playback. This type of embodiment can be achieved by preparing a content selection screen such that when content is selected, an instruction corresponding to that type of content is executed, and displaying this selection screen on a portable telephone in which these types of instructions can be interpreted and executed to change the settings of that device. Additionally, it can be applied to a portable telephone provided with a normal mode and a mode used when not wishing to disturb others in a public area, such as to access a specific site to select a mode. Of course, while this type of mode switching can be performed manually, in portable telephones which tend to have complicated operations, there is the advantage that it is easier to understand for users to switch the mode or function of portable telephones by accessing specific sites.

Additionally, when applying the present invention to portable telephones wherein the settings can be switched at a level more specific than modes, the settings such as screen size, audio volume, playback speed and the like used at the time of playback of the content can be changed according to the content. Furthermore, when selecting content which is to be distributed, it is possible to have the portable telephone execute a control instruction selected according to the content (an instruction for controlling the hardware resources of the portable telephone). As a result, it will become possible to turn the backlight of the liquid crystal display on or off according to the content, to play back music data (such as music data selected from at least one type of music used to give notification of a received call), or to have a reception call lamp (a lamp which lights up or blinks when a signal such as a telephone call or electronic mail is receive) blink at a timing which depends on the content. Of course, the settings to be switched need not be restricted to hardware resources. For example, a specific site can be accessed by a portable telephone which has software for transmitting and receiving electronic mail and has not been set for using this software, whereupon the portable telephone can run setup instructions (instructions for setting up software so as to be usable in the portable telephone) contained in the homepage of that site.

Additionally, according to the present invention, an embodiment wherein the portable telephone accesses a site for maintaining portable telephones, performs a test as to whether or not the control instructions sent from that site fulfill specifications such as transmission power, and automatically operates the electronic volume which controls the transmission power based on the results of the test. Additionally, an embodiment wherein a specific site for updating the software of the portable telephone is accessed by the portable telephone, and new software is downloaded from the site and installed in the portable telephone in accordance with control instructions sent from that site is also possible.

Additionally, an embodiment wherein a portable telephone having a normal menu and a menu which has been simplified for the purpose of reducing the complexity of operations accesses a specific site, and when a user selects an object for switching the menu in the user interface based on data sent from that site, the menu used in the portable telephone is switched is also possible. Additionally, it is possible to have a portable telephone having functions corresponding to a plurality of menu items access a specific site, and use checkboxes or the like to select desired menu items from a user interface based on the data sent from the site (a user interface presenting all of the menu items in a selectable manner), thereby enabling the user to readily customize the menu of the portable telephone. In this case, the portable telephone can be shipped with the capability only of using the functions required for accessing the site.

Additionally, in view of reducing complexity of operation, the object of control in the present invention is not limited to software resources. For example, it is possible to make the number of colors capable of being emitted by the reception lamp a single color for the purpose of reducing complexity of operation at the time of shipping of the portable telephone, but then to be able to change the number of colors to a plurality after accessing a specific site from the portable telephone, assigning each color a different meaning.

As is clear from the above, the feature of controlling activation, deactivation and setup of resources in the portable telephone from a remotely located server is also included within the scope of the present invention.

Furthermore, while the above-described embodiments and modifications give examples of application of the present invention to portable telephones, the application of the present invention is not limited to portable telephones, and may include PDA's (Personal Digital (Data) Assistants) having a communication function and portable or desktop computers having a transmission function. Of course, it is also possible to apply the present invention to data terminal equipments such as PDA's and computers not having a transmission function, and to terminal equipments formed by connecting communication terminals such as modems compatible with portable telephones or fixed networks.

What is claimed is:

1. A method for automatically reconfiguring an input device of a mobile communication terminal that receives communications services from a mobile wireless network, the method comprising:

accessing a network browsing functionality to receive a form having at least one object;

determining property information for the at least one object;

determining an input mode for the input device in response to the determined property information; and automatically reconfiguring the input device for the determined input mode.

2. The method of claim 1, wherein the object comprises an input field.

3. The method of claim 1, wherein the property information comprises input type for the at least one object.

4. The method of claim 3, wherein the input type is selected from the group consisting of a check box, a button, a list, and an input field.

5. The method of claim 1, wherein the property information comprises input mode for the at least one object; and wherein determining an input mode comprises selecting the input mode for the at least one object.

6. The method of claim 5, wherein the input mode comprises a language.

7. The method of claim 5, wherein the input mode comprises a set of characters in a language.

8. The method of claim 1, wherein the property information comprises a property for the at least one object.

9. The method of claim 8, wherein the property is selected from the group consisting of size, color, and destination.

10. The method of claim 1, wherein the property information for the at least one object is determined based on an input mode designating tag associated with the at least one object.

11. The method of claim 10, wherein the input mode designating tag comprises a character string.

12. The method of claim 1, wherein the input device for the mobile communication terminal comprises a keypad;
wherein one input mode for the input device comprises a numerical mode for inputting numbers via the keypad and another input mode for the input device comprises a character input mode for inputting characters via the keypad;
wherein the input device is automatically configured to the numerical mode if the property information indicates a numerical mode input; and
wherein the input device is automatically configured to the character mode if the property information indicates a character mode input.

13. The method of claim 1, wherein the mobile communication terminal further selectively implements multiple communication functionalities comprising a voice communication functionality and an electronic message communication functionality.

14. The method of claim 1, wherein the mobile communication terminal equipment comprises a mobile telephone; and
wherein accessing the form comprises accessing the form from a display of the mobile telephone.

15. The method of claim 14, wherein accessing the form from a display comprises placing a cursor on the object displayed on the display of the mobile telephone.

16. The method of claim 1, wherein determining an input mode comprises selecting the input mode from a plurality of available input modes; and
wherein automatically reconfiguring the input device comprises modifying the input device based on the selected input mode.

17. The method of claim 1, wherein the mobile communication terminal comprises a mobile telephone; and
wherein the form comprises HTML data.

18. The method of claim 1, wherein one input mode consists of inputting numerals and a second input mode consists of inputting characters.

19. The method of claim 1, further comprising displaying the form.

20. The method of claim 19, wherein the form is displayed based on the property information.

21. The method of claim 20, wherein the property information comprises a text input field and wherein the display comprises a blinking cursor.

22. The method of claim 20, wherein displaying the at least one object based on the property information comprises displaying the object based on the property information after a user selects the object.

23. The method of claim 22, wherein the property information comprises a text input field; and
wherein displaying the property information comprises displaying a blinking cursor in the object after the user selects the object.

24. The method of claim 22, wherein the property information comprises a list; and
wherein displaying the property information comprises displaying a plurality of choices for a user to select a choice from the plurality of choices.

25. The method of claim 1, further comprising inputting data for the object in the input mode.

26. The method of claim 1, further comprising generating a table of the objects on the form and corresponding properties for the objects.

27. The method of claim 26, wherein the properties are selected from the group consisting of size and color.

28. The method of claim 1, wherein the terminal equipment comprises a mobile telephone; and
wherein one of the objects comprises a send button.

29. The method of claim 28, wherein the property information comprises a destination; and
further comprising inputting data into the form and sending at least a portion of the inputted data to the destination.

30. The method of claim 1, wherein the input device comprises a 10-digit keypad; and
wherein one input mode for the input device comprises a numerical mode with the 10-digit keypad configured to input only numerals and another input mode for the input device comprises a character input mode with the 10-digit keypad configured to input only characters,
wherein automatically reconfiguring the input device for the determined input mode comprises:
automatically reconfiguring the 10-digit keypad to the numerical mode if the property information indicates a numerical mode; and
automatically reconfiguring the 10-digit keypad to the character mode if the property information indicates a character mode.

31. A mobile communication terminal comprising:
network browsing functionality;
a communication control that selectively implements the network browsing functionality to access through a network a form having at least one object;
display for displaying at least a portion of the form;
operating means having a plurality of input modes for inputting data on the display;
mode determination means for determining an input mode based on property information for the at least one object;
reconfiguration means for automatically reconfiguring the operating means for the determined input mode.

32. The mobile communication terminal of claim 31, wherein the object comprises an input field; and
wherein the display displays the input field.

33. The mobile communication terminal of claim 31, wherein the property information comprises input type for the at least one object.

34. The mobile communication terminal of claim 31, wherein the property information comprises input mode for the at least one object; and
wherein the mode determination means selects the input mode for the at least one object.

35. The mobile communication terminal of claim 31, wherein the mode determination means reads an input mode designating tag associated with the at least one object.

36. The mobile communication terminal of claim 31, wherein the terminal equipment comprises a mobile telephone; and
further comprising a receiver for receiving the form from a mobile communication network.

37. The mobile communication terminal of claim 31, further comprising a display;

wherein the form comprises a plurality of objects with property information associated with the objects;

wherein the display displays the plurality of objects;

wherein the operating means comprises a selecting means for selecting one of the plurality of objects; and wherein the mode determination means determines the input mode for the selected object.

38. The mobile communication terminal of claim 37, wherein selecting means comprises cursor moving means for moving the cursor onto one of the plurality of objects on the display.

39. The mobile communication terminal of claim 31, wherein the mobile communication terminal comprises a mobile telephone; and wherein the form comprises HTML data.

40. The mobile communication terminal of claim 31, wherein the input mode is selected from the group consisting of numerals and letters.

41. The mobile communication terminal of claim 31, further comprising a display for displaying the object based on determined input mode.

42. The mobile communication terminal of claim 41, wherein the property information comprises text; and wherein the display comprises a blinking cursor.

43. The mobile communication terminal of claim 41, further comprising selection means for selecting the displayed object; and wherein the display displays the object based on the determined input mode after a user selects the object with the selection means.

44. The mobile communication terminal of claim 43, wherein the property information comprises a text input field; and wherein the display displays a blinking cursor in the object after the user selects the object with the selection means.

45. The mobile communication terminal of claim 43, wherein the property information comprises a list; and wherein the display displays a plurality of choices for a user to select a choice from the plurality of choices with the selection means.

46. The mobile communication terminal of claim 31, wherein the mode determination means comprises table generating means for generating a table of the object on the form and corresponding properties for the objects.

47. The mobile communication terminal of claim 31, wherein one of the objects comprises a send button.

48. The mobile communication terminal of claim 44, wherein the terminal equipment comprises a mobile telephone; and further comprising a transmitter for transmitting at least a portion of data input with the operating means through a mobile communication network.

49. The mobile communication terminal of claim 31, wherein the operating means comprises a keypad.

50. The mobile communication terminal of claim 31, wherein the communication control further selectively implements multiple communication functionalities comprising a voice communication functionality.

51. The mobile communication terminal of claim 31, wherein the communication control further selectively implements multiple communication functionalities comprising an electronic message communication functionality.

52. The mobile communication terminal of claim 31, wherein the operating means comprises a keypad.

53. The mobile communication terminal of claim 52, wherein the keypad comprises a 10-digit keypad, wherein one input mode for the input device comprises a numerical mode for inputting numbers via the 10-digit keypad and another input mode for the input device comprises a character input mode for inputting characters via the 10-digit keypad;

wherein the 10-digit keypad is automatically configured to the numerical mode if the property information indicates a numerical mode input; and wherein the 10-digit keypad is automatically configured to the character mode if the property information indicates a character mode input.

54. The mobile communication terminal of claim 53, wherein the form downloaded from the network has a first object and a second object;

wherein the property information for the first object indicates a character mode and the property information for the second object indicates a numerical mode;

wherein the 10-digit keypad is automatically reconfigured to the character mode to input character information after selection of the first object; and wherein the 10-digit keypad is automatically reconfigured to the numerical mode to input numerical information after selection of the second object.

* * * * *